United States Patent
Harkness et al.

(10) Patent No.: US 9,563,897 B2
(45) Date of Patent: Feb. 7, 2017

(54) SYSTEMS AND METHODS TO IDENTIFY INTENTIONALLY PLACED PRODUCTS

(75) Inventors: David H. Harkness, Wilton, CT (US); Arun Ramaswamy, Tampa, FL (US)

(73) Assignee: THE NIELSEN COMPANY (US), LLC, New York, NY (US)

( * ) Notice: Subject to any disclaimer, the term of this patent is extended or adjusted under 35 U.S.C. 154(b) by 2722 days.

(21) Appl. No.: 12/049,077

(22) Filed: Mar. 14, 2008

(65) Prior Publication Data

US 2008/0235077 A1 Sep. 25, 2008

Related U.S. Application Data

(60) Provisional application No. 60/896,389, filed on Mar. 22, 2007.

(51) Int. Cl.
*G06Q 30/02* (2012.01)

(52) U.S. Cl.
CPC .......... *G06Q 30/02* (2013.01); *G06Q 30/0201* (2013.01)

(58) Field of Classification Search
None
See application file for complete search history.

(56) References Cited

U.S. PATENT DOCUMENTS

| | | | |
|---|---|---|---|
| 5,818,438 A * | 10/1998 | Howe et al. | 715/718 |
| 3,317,782 A1 | 11/2001 | Himmel et al. | |
| 6,434,614 B1 | 8/2002 | Blumenau | |
| 6,567,982 B1 | 5/2003 | Howe et al. | |
| 6,606,745 B2 * | 8/2003 | Maggio | 725/23 |
| 7,020,336 B2 * | 3/2006 | Cohen-Solal et al. | 382/204 |
| 7,305,693 B2 | 12/2007 | Blackketter et al. | |
| 2002/0065034 A1 * | 5/2002 | Zhang | 455/2.01 |
| 2002/0087969 A1 * | 7/2002 | Brunheroto et al. | 725/13 |
| 2003/0093790 A1 * | 5/2003 | Logan et al. | 725/38 |
| 2003/0110507 A1 | 6/2003 | Dimitrova et al. | |
| 2005/0251287 A1 * | 11/2005 | Thornton et al. | 700/233 |
| 2007/0039018 A1 * | 2/2007 | Saslow et al. | 725/22 |

(Continued)

FOREIGN PATENT DOCUMENTS

| | | |
|---|---|---|
| WO | 2005079501 | 9/2005 |
| WO | 2005086969 | 9/2005 |

(Continued)

OTHER PUBLICATIONS

Australian Government issued an examiner's first report in connection with Australian Application No. 2008/231138, on Aug. 17, 2010, 2 pages.

(Continued)

*Primary Examiner* — Anita Coupe
(74) *Attorney, Agent, or Firm* — Hanley, Flight and Zimmerman, LLC.

(57) ABSTRACT

Systems and methods to identify intentionally placed products in media content are disclosed. A disclosed system to detect intentionally placed products in media content includes a placement monitor site to record an occurrence of a first intentionally placed product within first broadcast media content in a product placement record; an audience measurement site to record an audience interaction with a second intentionally placed product in second broadcast media content in an event record; and a collection facility to receive the product placement record and the event record.

19 Claims, 5 Drawing Sheets

(56) References Cited

U.S. PATENT DOCUMENTS

2007/0073585 A1 3/2007 Apple et al.
2007/0290878 A1* 12/2007 Maggio .................. 340/825.24

FOREIGN PATENT DOCUMENTS

| WO | WO 2005086969 A2 * | 9/2005 |
|---|---|---|
| WO | 2005115011 | 12/2005 |
| WO | WO 2005115011 A1 * | 12/2005 |

OTHER PUBLICATIONS

The International Bureau of WIPO, "International Preliminary Report on Patentability," corresponding to International Application No. PCT/US2008/057095, mailed Oct. 1, 2009, issued Sep. 22, 2009, 9 pages.
International Search Report corresponding to International Patent Application No. PCT/US08/57095, mailed Dec. 8, 2008, 3 pages.
Written Opinion of the International Searching Authority corresponding to International Patent Application No. PCT/US08/57095, mailed Dec. 8, 2008, 7 pages.
Nielsen Media Research, "Nielsen Measures the Impact of Product Placement," New York, New York, Nov. 15, 2006.
Kaplan, David, "TNS Launches Product Placement Measurement Service," in 'MediaPost Publications,' Jun. 7, 2005.
Mediapost, "Nielsen Announces Product Placement Tracking Service," in 'Marketing Vox,' Dec. 2, 2003.
Martel, Thomas and John Freyhof, "Evaluating Product Placements in Television: A White Paper," 2006.
The State Intellectual Prperty Office of China, Office Aciton, issued in corresponding Chinese Patent Application No. 200880013845.7, on Jul. 6, 2011, (12 pages).
IP Australia, "Certificate of Grant", issued in connection with Australian Patent Application No. 2012216513, dated May 28, 2015 (1 page).
IP Australia, "Notice of Acceptance", issued in connection with Australian Patent Application No. 2012216513, dated Feb. 2, 2015 (2 pages).
IP Australia, "Patent Examination Report", issued in connection with Australian Patent Application No. 2012216513, dated Sep. 20, 2013, (3 pages).
Canadian Intellectual Property Office, "Office Action", issued in connection with Application No. 2687691, dated Mar. 6, 2012, (3 pages).
Canadian Intellectual Property Office, "Office Action", issued in connection with Application No. 2687691, dated Dec. 12, 2014, (4 pages).
Canadian Intellectual Property Office, "Office Action", issued in connection with Application No. 2687691, dated Oct. 6, 2015, (5 pages).
IP Australia, "Patent Examination Report No. 1", issued in connection with application No. 2015202419, on Nov. 5, 2015, 5 pages.
IP Australia, "Patent Examination Report No. 2", issued in connection with application No. 2015202419, on May 20, 2016, 4 pages.
Chinese Patent Office, "Office Action", issued in connection with Application No. 200880013845.7, dated Jun. 5, 2012, (3 pages).
Chinese Patent Office, "Notice of Allowance", issued in connection with Application No. 200880013845.7, dated Dec. 28, 2012, (2 pages).
European Patent Office, "Extended European Search Report", issued in connection with Application No. 08743929.5-1241, dated Dec. 23, 2011, (8 pages).
European Patent Office, "European Search Report", issued in connection with Application No. 08743929.5, dated Feb. 8, 2013, (6 pages).
Hong Kong Patent Office, "Certificate of Grant", issued in connection with Application No. 10103409.7, dated Jul. 26, 2013, (3 pages).
Canadian Intellectual Property Office, "Notice of Allowance," issued in connection with application No. 2,687,691 on Sep. 20, 2016, 1 page.
IP Australia, "Patent Examination Report No. 3," issued in connection with application No. 2015202419, on Oct. 31, 2016, 4 pages.

* cited by examiner

SYSTEMS AND METHODS TO IDENTIFY INTENTIONALLY PLACED PRODUCTS

RELATED APPLICATION

This patent claims priority from U.S. provisional patent application Ser. No. 60/896,389, filed on Mar. 22, 2007, entitled "Systems and Methods to Identify Intentionally Placed Products," which is hereby incorporated by reference in its entirety.

FIELD OF DISCLOSURE

The present disclosure relates generally to media measurement and, more particularly, to systems and methods to identify intentionally placed products in media content.

BACKGROUND

As used herein, "broadcast" refers to any sort of electronic transmission of any sort of media signals from a source of any kind to one or more receiving devices of any kind. Thus, a "broadcast" may be a cable broadcast, a satellite broadcast, a terrestrial broadcast, a radio frequency (RF) free television broadcast, a radio broadcast, and/or an internet broadcast or pointcast. Broadcasts are expressly defined to include video on demand (VOD) transmission. A "broadcaster" may be any entity that transmits signals for reception by one or more receiving devices. The signals may include content (also referred to herein as "programs"), and/or commercials (also referred to herein as "advertisements"). An "advertiser" is any entity that provides an advertisement for broadcast. Traditionally, advertisers have paid broadcasters to interleave commercial advertisements with broadcast content (e.g., in a serial "content-commercial-content-commercial" format) such that, to view an entire program of interest, the audience is expected to view the interleaved commercials. This approach enables broadcasters to supply free programming to the audience while collecting fees for the programming from sponsoring advertisers.

To facilitate this sponsorship model, companies that rely on broadcast video and/or audio programs for revenue, such as advertisers, broadcasters and content providers, wish to know the size and demographic composition of the audience (s) that consume program(s). Merchants (e.g., manufacturers, wholesalers and/or retailers) also want to know this information so they can target their advertisements to the populations most likely to purchase their products. Audience measurement companies have addressed this need by, for example, identifying the demographic composition of a set of statistically selected households and/or individuals (i.e., panelists) and the program consumption habits of the member(s) of the panel. For example, audience measurement companies may collect viewing data on a selected household by monitoring the content displayed on that household's television(s) and by identifying which household member(s) are present in the room when that content is displayed. An analogous technique is applied in the radio measurement context.

Gathering this audience measurement data has become more difficult as the diversity of broadcast systems has increased. For example, while it was once the case that television broadcasts were almost entirely radio frequency, terrestrial based, broadcast systems (i.e., traditional free television), cable and satellite broadcast systems have now become commonplace. Further, these cable and/or satellite based broadcast systems often require the use of a dedicated receiving device such as a set top box (STB) or an integrated receiver decoder (IRD) to tune, decode, and/or display broadcast programs. To complicate matters further, some of these receiving devices for alternative broadcast systems as well as other receiving devices such as local media playback devices (e.g., video cassette recorders, digital video recorders, and/or personal video recorders) have made time shifted viewing of broadcast and other programs possible.

This ability to record and playback programming (i.e., time-shifting) has raised concerns in the advertising industry that consumers employing such time shifting technology will skip or otherwise fast forward through commercials when viewing recorded programs, thereby undermining the effectiveness of the traditional interleaved advertising model. To address this issue, rather than, or in addition to, interleaving commercials with content, merchants and advertisers have recently begun paying content creators a fee to place their product(s) within the content itself. For example, as shown schematically in FIG. 1, a manufacturer of a product (e.g., sunglasses) might pay a content creator a fee to have their product appear in a broadcast program (e.g., to have their sunglasses worn by an actor in the program) and/or to have their product mentioned by name during the program. The presence of a product in a program is represented schematically in FIG. 1 by the sunglasses icon 12 appearing in the display screen 10. However, it will be appreciated that the sunglasses are merely illustrative and any other product of interest could be integrated into the programming in any desired fashion (e.g., if the product were a soft drink, having a cast member drink from a can displaying the logo of the soft drink).

Due to the placement of the sunglasses 12 in the program, the advertisement for the sunglasses 12 is embedded in the broadcast content, rather than in a commercial interleaved with the content. Consequently, it is not possible for an audience member to fast forward or skip past the embedded advertisement 12 without also fast forwarding or skipping past a portion of the program in which the advertisement is embedded. As a result, it is believed that audience members are less likely to skip the advertisement 12 and, conversely, that audience members are more likely to view the advertisement 12 than in the traditional interleaved content-commercial(s)-content-commercial(s) approach to broadcast advertising.

The advertising approach of embedding a product in content is referred to herein as "intentional product placement," and products placed by intentional product placement are referred to herein as "intentionally placed products." It will be appreciated that content may include intentionally placed products (i.e., products that are used as props in the content in exchange for a fee from an advertiser and/or merchant) and unintentionally place products. As used herein, "unintentionally placed products" are products that are used as props in content by choice of the content creator without payment from an advertiser or merchant. Thus, an unintentionally placed product used as a prop is effectively receiving free advertisement, but may have been included for the purpose of, for example, storytelling and not for the purpose of advertising.

DETAILED DESCRIPTION

With the advent of newer media content delivery technologies (e.g., digital broadcasting, cable broadcasting, satellite broadcasting, Internet broadcasting, video-on-demand services, etc), it has become possible to make content more interactive. Advertisers have been seeking ways to adapt this increased interactivity functionality to improve the effectiveness of intentional product placement advertisements. To this end, advertisers are contemplating co-broadcasting product information or other advertising information (collectively "sales information") with intentionally placed products. This sales information may be broadcast in any manner. For example, it may be included as metadata carried in the data stream of a digital television broadcast. The sales information is carried with the broadcasting content, but may not be displayed or otherwise presented to the audience unless the audience takes some action.

For example, as a vehicle to enable the audience to access the sales information, the intentionally placed product (e.g., the sunglasses 12 of FIG. 1) may be selectable on the audience's display device via a point and click device (or any other input device). For instance, using a remote control with point and click capability, a mouse, or any other input device, an audience member may be able to move a pointer onto the intentionally placed product (e.g., onto the sunglasses 12 on the actor's face), and to press an input button (e.g., "click") to select the intentionally placed product. Alternatively, the remote control or other input device may not be a point and click type device and, thus, may not facilitate on screen selection. Instead, the input device (e.g., the remote control) may be provided with an input button which may be depressed to request sales information (e.g., off-screen selection) for an intentionally placed product (e.g., a currently presented product or one that was presented within some time frame (e.g., within the last X minutes).

Figure 2:
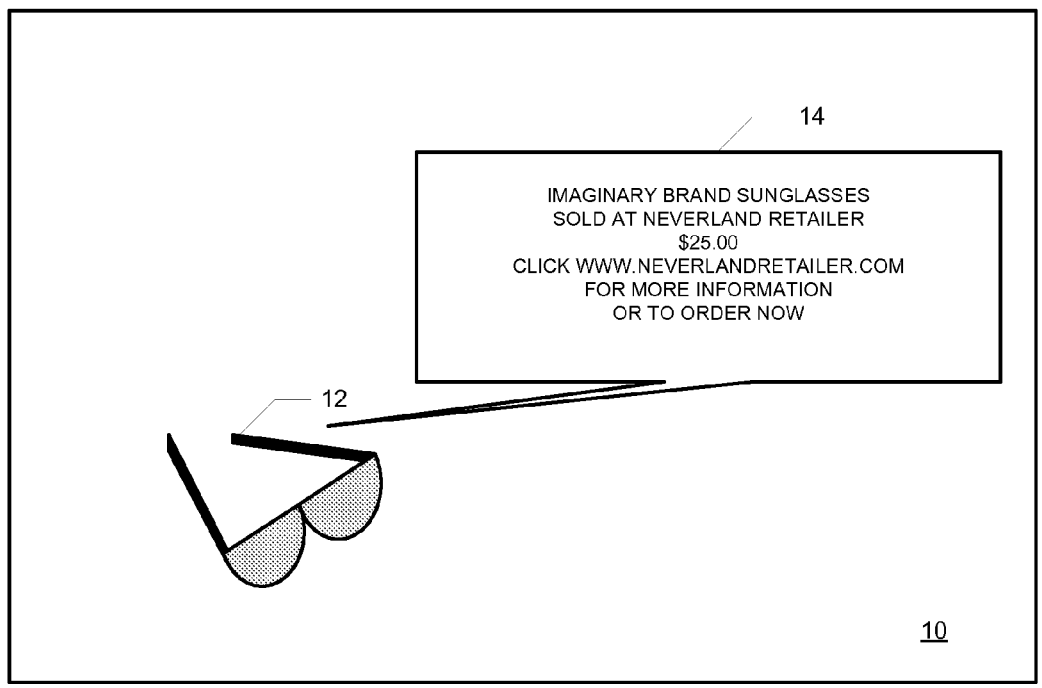
FIG. 2 is a schematic illustration of the example display of FIG. 1 shown after the example product has been selected by an audience member such that sales information associated with the product is displayed.

Upon detecting the on-screen or off-screen selection of the intentionally placed product, a controller (e.g., the processor of a STB presenting the content) accesses and presents the sales information to the audience at that presentation site. For example, as shown in FIG. 2, the STB may generate a pop-up graphic displaying the co-broadcasted sales information. In the example of FIG. 2, the displayed sales information includes the name of the intentionally placed product (e.g., Imaginary Brand Sunglasses), a point of sale for the product (e.g., Neverland Retailer), a price for the product (e.g., $25), and a universal resource locator (URL) at which additional information is available (e.g., www.neverlandretailer.com). The URL may be clickable via a point-and-click device or otherwise activatable (e.g., via a "activate displayed link" button on a remote control) to enable the audience to access a web page via the Internet. The webpage may include additional advertising information and/or provide an interface for purchasing the intentionally placed product (e.g., for home delivery).

Figure 3:
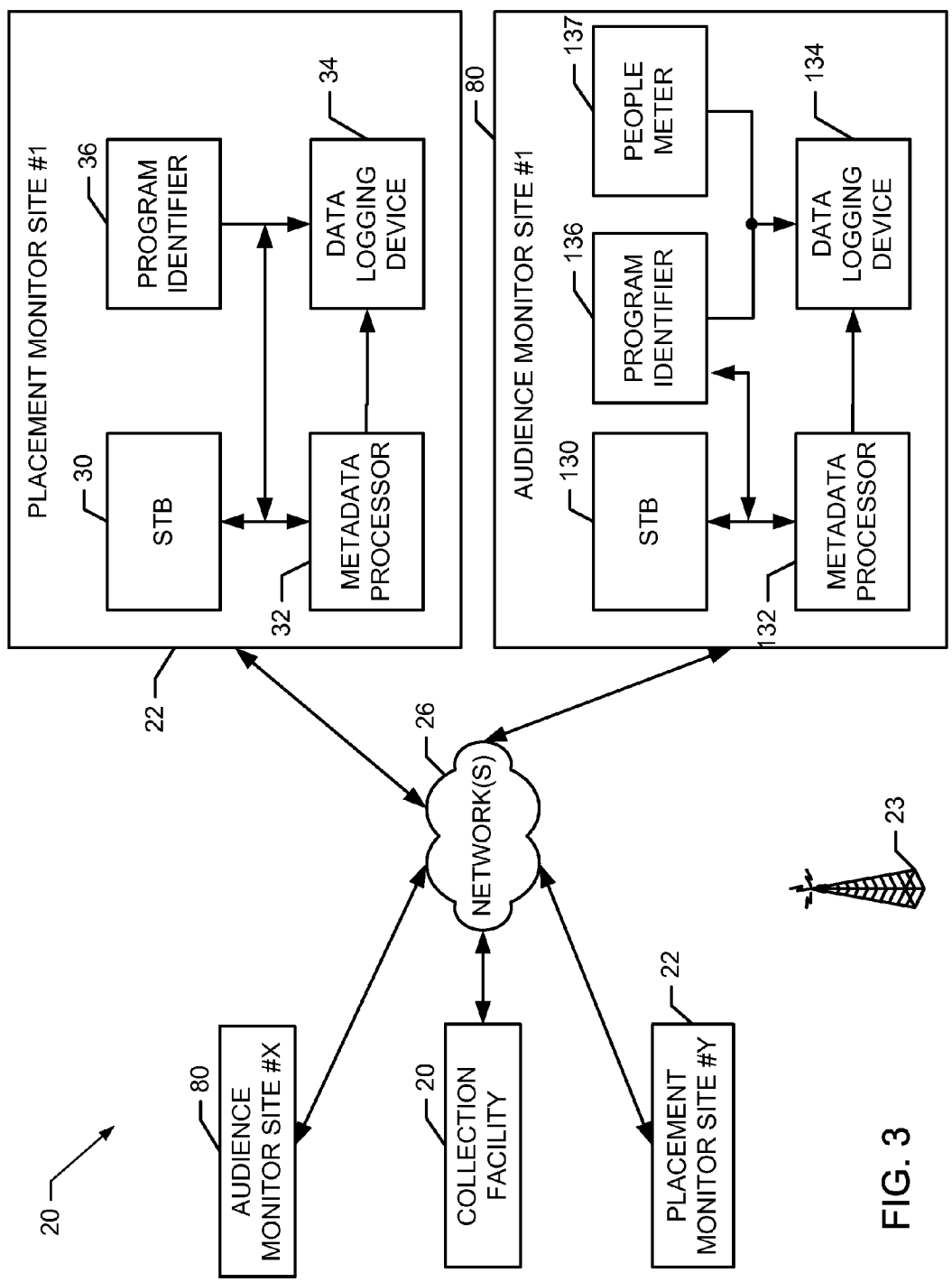
FIG. 3 is a schematic illustration of an example system for detecting products placed intentionally in media content and/or for monitoring audience interaction with such products.

FIG. 3 illustrates an example system 20 for detecting products placed intentionally in media content and/or for monitoring audience interaction with such intentionally placed products. The example system 20 includes one or more placement monitor sites 22 for automatically detecting and recording the presence of intentionally placed products in broadcast media. In the illustrated example, each of the placement monitor sites 22 is structured to monitor one or more content sources (e.g., one or more broadcast channels from any type of broadcaster 23 (e.g., television, radio, Internet, cable, satellite, RF, etc.) for the presence of intentionally placed products. When an intentionally placed product is detected, the sales information broadcast with the intentionally placed product is logged together with the time of broadcast/time of detection of the same, the identity of the source of the monitored content (e.g., the channel), and/or the name of the monitored content (e.g., the program name). The information collected by a placement monitor site 22 is referred to herein as "product placement information." Periodically or aperiodically (e.g., at certain times, when a certain amount of data is collected, continuously, etc.), the collected product placement information is sent to a collection facility 24 via a communication medium 26.

The collection facility 24 processes the product placement information from one or more placement monitor sites 22 to develop reports that may be, for example, sold or otherwise provided to merchants and/or advertisers. The reports may provide verification that the intentionally placed products were in fact placed and broadcast in accordance with the contractual arrangements between the content provider, advertiser, and/or broadcaster. It may also provide a vehicle for triggering payment obligations by the advertiser or merchant (e.g., on a pay-per-broadcast or pay-per person view type of arrangement). Additionally or alternatively, it may provide advertisers and/or merchants with information about the advertisement strategies of competitors.

Although the communication medium 26 is illustrated in FIG. 3 as the Internet, any other communication medium (e.g., the public switched telephone network (PSTN), a private network, a virtual private network, etc.) may alternatively be employed. Similarly, although multiple placement monitor sites 22 are shown in FIG. 3, any number of sites 22 (including one placement monitor site 22) may be employed. To monitor a plurality of broadcast markets in different geographic regions, it may be appropriate to place one or more placement monitor site 22 in each such market/geographic region.

An example placement monitor site 22 is illustrated in detail in FIG. 3. The placement monitor sites 22 may be substantially similar or identical. In the example of FIG. 3, the placement monitor site includes a STB 30 to receive and process broadcast signals. Although shown as a STB, the STB 30 could be implemented as any type of receiving device such as an IRD, a personal computer (PC), a personal video recorder, a cable converter, a tuner, etc. adapted to receive any type of media content (e.g., television, radio, etc.) via any type of medium (e.g., RF, Internet, cable, satellite, etc.). In the illustrated example, sales information is broadcast for each intentionally placed product 12. The sales information is broadcast before, with, or after, the portion of the media content containing the intentionally placed product. Although the sales information can be broadcast in any desired fashion, in the illustrated example, the sales information is metadata carried, for example, in the data stream of a digital broadcast (e.g., digital television).

In order to detect the presence of an intentionally placed product, the placement monitor site 22 of the illustrated example is provided with a metadata processor 32. The metadata processor 32 of the illustrated example is structured to monitor the received content for sales information. For example, the metadata processor 32 can monitor the data stream accompanying a digital television broadcast for metadata and can extract any sales information contained in any detected metadata. Preferably, the metadata processor is structured to capture all available metric for the product placement including, by way of examples, not limitations, the size of the intentional product placement (e.g., the percentage of the screen of the display occupied by the intentionally placed product), the duration for which the intentionally placed product was displayed (e.g., number of frames), etc. This data can be processed by the collection facility 20 to verify that the placement for the intentionally placed product satisfied the contract between the advertiser paying for the placement and the entity responsible for placing the product in the content.

Figure 1:
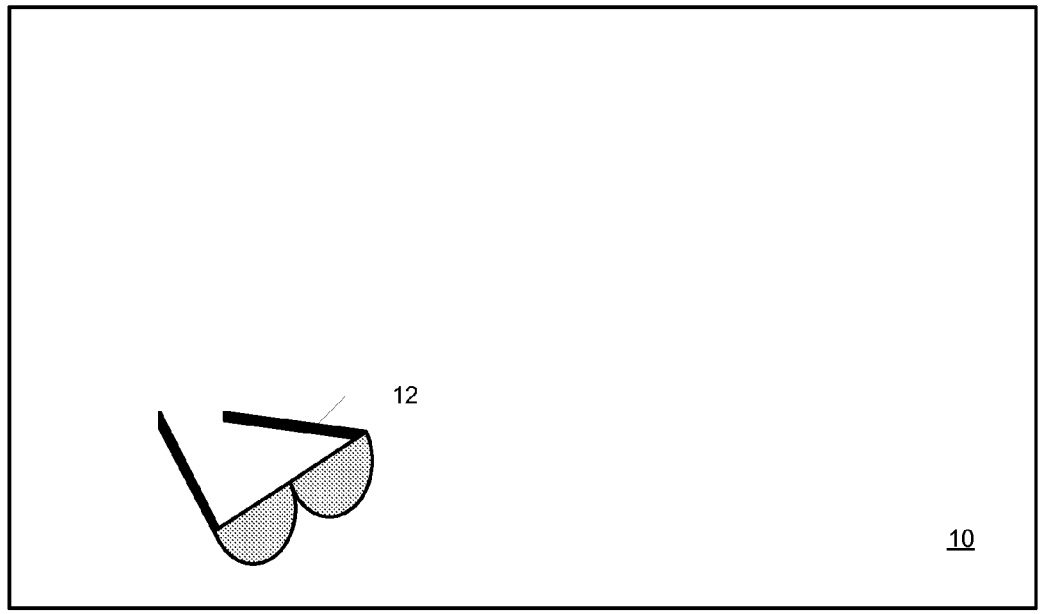
FIG. 1 is a schematic illustration of an example display illustrating an example product which was intentionally placed in example media content.

For the purpose of collecting product placement information, the example placement monitor site 22 of FIG. 1 is provided with a data logging device 34. The data logging device can be implemented by any type of memory device (e.g., a hard disk drive, an optical disk drive, flash memory, etc.). In the illustrated example, the data logging device 34 stores the product placement information as time stamped product placement records.

In order to identify the program in which an intentionally placed product is located, the example placement monitor site 22 of FIG. 1 is provided with a program identifier 36. The program identifier 36 can be structured to monitor and identify the tuned program using any desired methodology. For example, the program identifier 36 can identify the program by determining a tuned channel (e.g., automatically or via a manual input) and comparing the tuned channel to a program schedule. Alternatively or additionally, the program identifier 36 can be structured to monitor the tuned program signal and/or an output of a presentation device caused by playing the tuned program (e.g., an audio or video output) for one or more identification codes. The identification codes can be an audience measurement code inserted into a portion of the program signal (e.g., the audio) for the express purpose of identifying the tuned program, or they can be codes present in the signal for another purpose (e.g., program identification headers (PIDs) used for selecting packets from a multiplexed stream of packets in a digital media stream including multiple programs, metadata, closed captioning information, etc.). Alternatively, the program identifier 36 can be structured to create a signature of one or more aspects of the program signal. A signature can be a sample of the signal and/or a representation of any aspect(s) of the signal.

Irrespective of the precise methodology the program identifier 36 employs to determine the identity of the tuned program, the program identifier 36 provides the collected program identification information (e.g., program name, source, channel number or other identifier, etc.) to the data logging device 34 for inclusion in the time stamped event record created for the detected intentional product placement. As a result, the data logging device 34 stores an event record for each detected intentional product placement which identifies the product, the sales information associated with the product, the time at which such product was detected and the program identification information collected by the program identifier 36. The data logging device 34 periodically or aperiodically exports the collected product placement information to the collection facility 24 via the network 26. To this end, the placement monitor site includes a communication device (e.g., a modem).

Although shown as separate from the STB 30 in the example of FIG. 3, any/or all of the example metadata processor 32, the data logging device 34 and/or the program identifier 36 may be implemented within the STB 30. For example, some or all of any of the example metadata processor 32, the data logging device 34 and/or the program identifier 36 may be implemented by software and/or firmware executing on the processor of the STB 30 and/or the data logging device 34 may be implemented by the memory resources of the STB 30.

Figure 4:
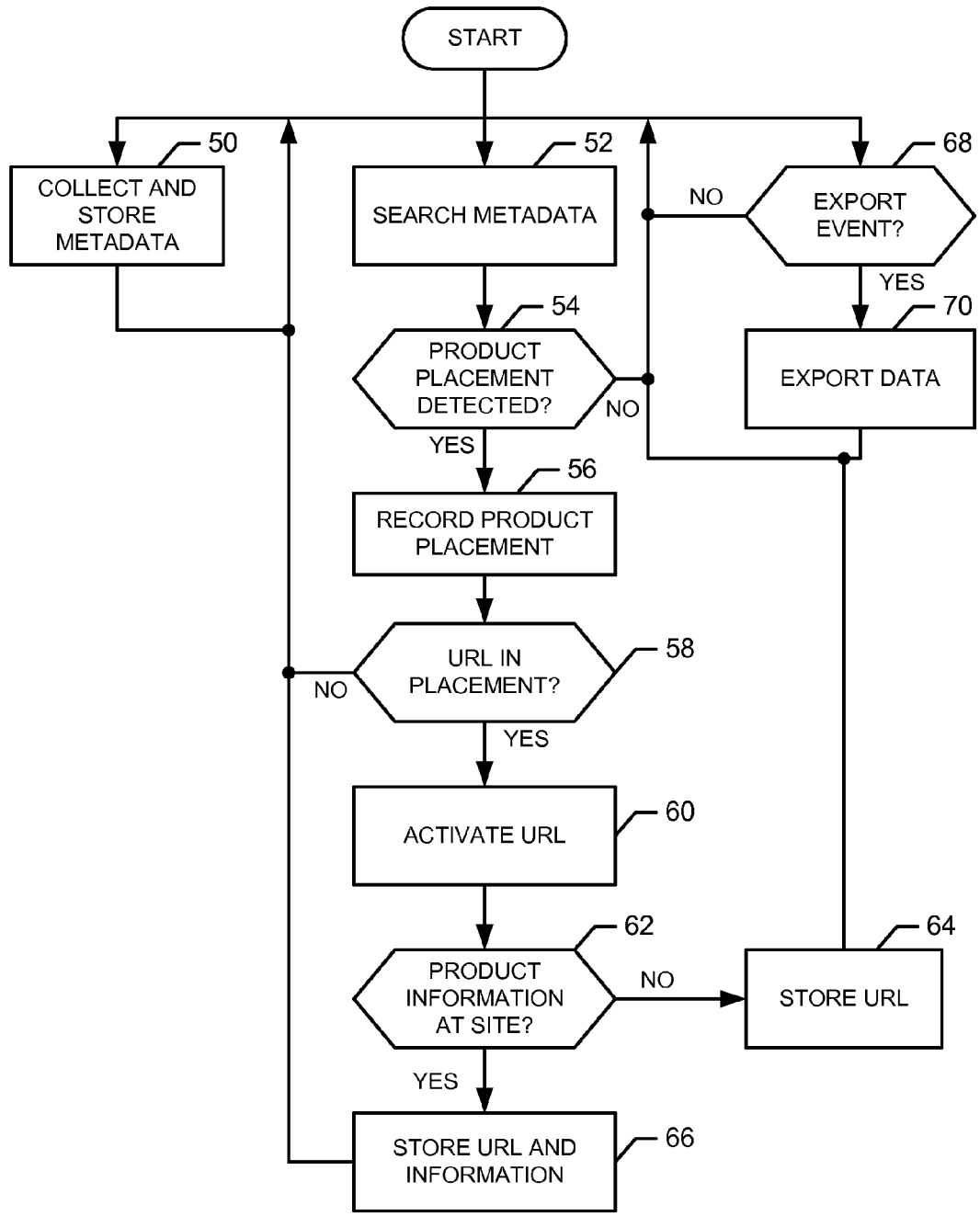
FIG. 4 is a flowchart representative of example machine accessible instructions that may be executed to implement any or all of the example placement monitor sites of FIG. 3.

A flowchart representative of example machine readable instructions for implementing any or all of the placement monitor sites 22 of FIG. 3 is shown in FIG. 4. For example, the example machine accessible instructions of FIG. 4 may be embodied in coded instructions stored on a tangible medium such as a flash memory, a read-only memory (ROM) and/or random-access memory (RAM) associated with a processor (e.g., the example processor 600 discussed below in connection with FIG. 6. Alternatively, some or all of the example machine accessible instructions of FIG. 4 may be implemented using any combination(s) of application specific integrated circuit(s) (ASIC(s)), programmable logic device(s) (PLD(s)), field programmable logic device(s) (FPLD(s)), discrete logic, hardware, software, and/or firmware. Also, some or all of the example machine accessible instructions of FIG. 4 may be implemented manually or as any combination of any of the foregoing techniques. For example, any or all of the metadata processor 32, the data logging device 34, and/or the program identifier 36 may be implemented as any combination of firmware, software, discrete logic and/or hardware. Thus, for example, any of the example metadata processor 32, the example data logging device 34, and/or the example program identifier 36 could be implemented by one or more circuit(s), programmable processor(s), application specific integrated circuit(s) (ASIC (s)), programmable logic device(s) (PLD(s)) and/or field programmable logic device(s) (FPLD(s)), etc. When any of the appended claims are read to cover a purely software implementation, at least one of the example metadata processor 32, the example data logging device 34, and/or the example program identifier 36 recited in that claim are hereby expressly defined to include a tangible medium such as a memory, DVD, CD, etc. Further, although the example machine accessible instructions of FIG. 4 are described with reference to the flowcharts of FIG. 4, many other methods of implementing the machine accessible instructions of FIG. 4 may be employed. For example, the order of execution of the blocks may be changed, and/or one or more of the blocks described may be changed, eliminated, sub-divided, or combined. Additionally, any or all of the example machine accessible instructions of FIG. 4 may be carried out sequentially and/or carried out in parallel by, for example, separate processing threads, processors, devices, discrete logic, circuits, etc.

The program of FIG. 4 begins at block 50 where the metadata processor spawns a first thread to collect and store any metadata present in a monitored program stream. The metadata is written to a local memory which serves as a temporary store to enable analysis of the metadata to determine if it is indicative of the presence of an intentionally placed product. The first thread continues to operate as long as monitoring is desired, which in some examples will be continuously.

At block 52, the metadata processor 32 spawns a second thread to process the metadata collected by the first thread. In particular, the second thread searches the metadata in the temporary storage for any sales information that can be triggered by selecting a product placed in the content (block 52). If such metadata is present (block 52), the metadata processor 32 concludes that an intentionally placed product is present (block 54). If an intentionally placed product is present (block 54), control proceeds to block 56. If an intentionally placed product is not detected (block 54), control returns to block 52 to continue searching the metadata.

Assuming, for purposes of discussion, that an intentionally placed product is detected (block 54), control proceeds to block 56. At block 56, the metadata processor 32 creates a time stamped product placement record in the data logging device 34 (block 56). The metadata processor 32 then examines the sales information contained in the metadata for the presence of a universal resource locator (URL) (block 58). If no URL is present, (block 58), control returns to block 52 to continue searching the metadata.

Assuming for purposes of discussion that a URL was detected in the metadata (block 58), control proceeds to block 60. At block 60, the metadata processor 32 activates the URL to thereby send a request for the webpage referenced by the URL over the Internet. When the webpage is downloaded, the metadata processor parses the downloaded webpage (e.g., reviews the HTML instructions) for any additional product information (block 62). If no additional information can be parsed from the webpage (block 62), control proceeds to block 64 where the metadata processor writes the URL to the time stamped product placement record for the product in question in the data logging device 34 (block 64). Storing the URL in this fashion enables a human operator or other automatic device at the collection facility 24 to access the webpage at a later date to attempt to obtain additional useful information. Control then returns to block 52 to continue searching the metadata.

If additional information can be parsed from the webpage (block 62), control proceeds to block 66 where the metadata processor writes the URL and the additional information collected from the website to the time stamped product placement record associated with the product in question in the data logging device 34 (block 66). Control then returns to block 52 to continue searching the metadata.

In order to efficiently search the metadata, it may be appropriate to spawn multiple instances of the second thread to operate in parallel.

Further, to control the export of the product placement records from the data logging device 34 to the collection facility 24, the metadata processor 32 spawns a third thread at block 68. The third thread monitors for an export event. An export event can be the expiration of a timer, the occurrence of a certain time of day, a state of the data logging device 34 (e.g., 90 percent full), availability of an Internet connection, or any other event. When an export event occurs (block 69), control advances to block 70 where the communication device of the placement monitor 22 is activated to export the product placement records (i.e., the product placement information) from the data logging device 34 to the collection facility 24 via the network 26.

Returning to FIG. 3, in addition to detecting intentionally placed products in media content, the example system 20 is capable of monitoring audience interaction with intentionally placed products. To this end, the example system 20 is provided with a plurality of audience monitor sites 80. The audience measurement sites 80 of the illustrated example are implemented at locations (e.g., households, restaurants, bars, etc.) that have agreed to participant in audience measurement research. In the illustrated example, the locations and/or the audience members associated with the locations of the illustrated example are selected by an audience measurement company to be statistically representative of a larger population or population segment(s) (e.g., one or more demographic group(s)) of interest.

In the illustrated example, each audience monitor site 80 detects the presence of intentionally placed products in media content tuned by the monitored audience. As with the placement monitor sites 22 discussed above, the audience monitor sites 80 create event records reflecting the detection of each intentionally placed product, the time at which the intentionally placed product was detected, and the identity of the program in which the product was presented. In addition, the audience monitor sites 80 log the identit(ies) of the audience members exposed to the intentionally placed product(s) and collect data concerning the audience's interaction with the intentionally place product, if any.

An example audience monitor site 80 is shown in greater detail in FIG. 3. The example audience monitor site 80 of FIG. 3 includes many of the same structures as the example placement monitor site 22 discussed in detail above. In the interest of brevity, the description of the parts in common between the example audience monitor site 80 and the example placement monitor site 22 will not be repeated. Instead, the following discussion will focus on the differences between the corresponding structures of the monitors 22, 88. In areas where the following discussion is silent, the above description of the structures in the placement monitor site 22 is applicable and, thus, the interested reader is referred to the above discussion of the placement monitor site 22 for a complete description of those areas and/or structures. To facilitate this process, like parts are numbered with like numbers increased by 100 in the example audience monitor site 80 relative to the example placement monitor site 22.

In the example of FIG. 3, the example audience monitor site 80 includes an STB 130, a metadata processor 132, a data logging device 134 and a program identifier 136. As in the placement monitor site 22, the STB 130 is a receiving device (in this case owned or leased by the audience member) to tune broadcast programs of interest. The metadata processor 132 of the example audience monitor site 80 monitors the content tuned by the STB 130 to detect the presence of intentionally placed products in the tuned content. As in the placement monitor site 22, the metadata processor 132 of the example audience monitor site 80 may determine the presence of an intentionally placed product by detecting sales information in the metadata associated with the tuned program. The example metadata processor 132 of the example audience monitor site 80 is more sophisticated than the metadata processor 32 of the example placement monitor site 22 in that the example metadata processor 132 of the example audience monitor site 80 monitors user interaction with the intentionally placed product. For example, the example metadata processor 132 of the example audience monitor site 80 monitors and logs whether an audience member selects an intentionally placed product to access the sales information, how long the audience is exposed to the sales information, whether a URL associated with the intentionally placed product is selected, how long a webpage associated with the URL is displayed, and/or other useful user interaction information. The user interaction(s) can be collected in any desired fashion, for example, by monitoring operating system events within the STB 130 and/or by intercepting infrared (or other) commands from a remote control to the STB 130.

As with the example data logging device 34 of the example placement monitor site 22 discussed above, the example data logging device 134 of the example audience monitor site 80 stores time stamped records (referred to herein as event records) each of which reflects the detection of an intentionally placed product, the time at which such product was detected, the channel on which the media content containing the intentionally placed product was broadcast, and/or the program in which the intentionally placed product was embedded. To this end, the example audience monitor site 80 also includes a program identifier 136 that operates similarly to the program identifier 36 to identify the channel tuned by the audience at the time the intentionally placed product is detected and/or to detect identifying information (e.g., the program name, code(s), signature(s), etc.) for the program carrying the product. Any desired mechanism may be employed to identify the tuned program. The task of the program identifier 136 may be more difficult than the task of the program identifier 36 in that the channel tuned in the audience monitor site 80 is subject to (possibly rapid) change, whereas the channel tuned in the placement monitor site 22 may be fixed and/or changed in a known fashion to scan multiple channels.

In addition to the data noted above, the event records stored in the example data logging device 134 of the example audience monitor site 80 also include audience interaction information concerning the interaction of the audience with the intentionally placed product. For example, each event record may store data indicating whether an audience member selected the corresponding intentionally placed product to access the sales information, how long the audience was exposed to the sales information, whether a URL associated with the intentionally placed product was selected by the audience, how long a webpage associated with the URL was displayed, and/or other useful user interaction information.

Furthermore, each event record stores the identit(ies) of the persons present in the audience when an intentionally placed product is detected in tuned media content. To enable the collection of such audience composition information, the example audience monitor site 80 includes any type of people meter 137. The people meter 137 can be an active people meter that requires the audience members to self identify (e.g., by selecting inputs provided by the people meter 137 when they enter or exit the audience). Alternatively, the people meter 137 may be a passive people meter that attempts to automatically identify members of the audience. As still another alternative, the people meter 137 may be implemented as a hybrid people meter which attempts to count the number of persons in the audience without specifically identifying audience members, and only prompts the audience members to identify themselves when the count of people changes. Irrespective of the precise methodology employed by the people meter 137, the people meter 137 of the illustrated example is in communication with the data logging device 134 to enable writing of the audience member composition into the event records.

The example audience monitor sites 80 of the example of FIG. 3 may be substantially similar or identical. Alternatively, the audience monitor sites may vary to suit the reception equipment employed in the monitored site. This variation may primarily effect the program identifier 136 as it is adapted to identify tuned content based on the type of reception equipment employed at the audience site.

Although shown as separate from the STB 130 in the example of FIG. 3, any or all of the example metadata processor 132, the data logging device 134, the program identifier 136 and/or the people meter 137 may be implemented within the STB 130. For example, some or all of any of the example metadata processor 132, the data logging device 134, the program identifier 136 and/or the people meter 137 may be implemented by software and/or firmware executing on the processor of the STB 130 and/or the data logging device 134 may be implemented by the memory resources of the STB 130.

Figure 5:
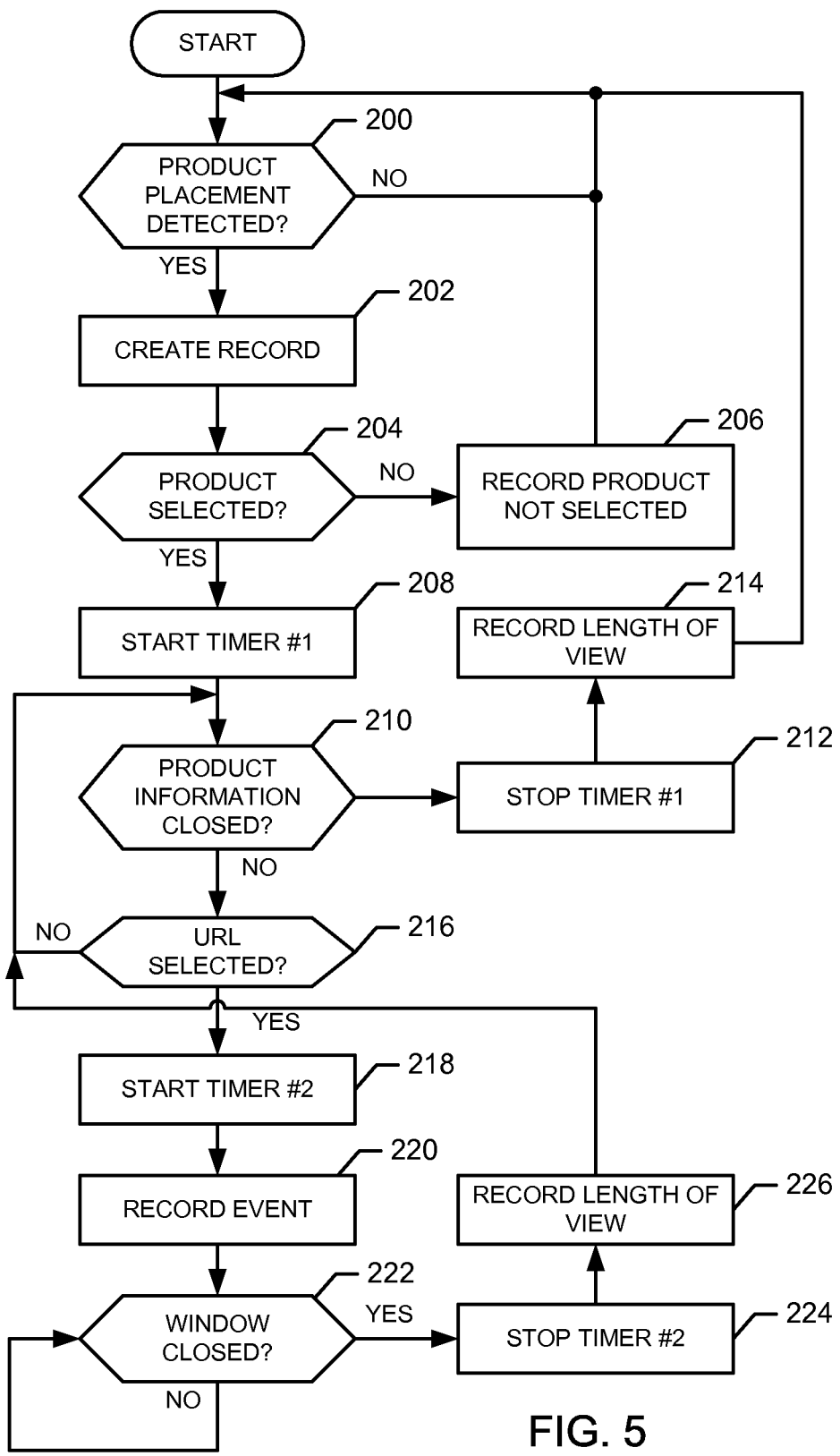
FIG. 5 is a flowchart representative of example machine accessible instructions that may be executed to implement any or all of the example audience monitor sites of FIG. 3.

A flowchart representative of example machine readable instructions for implementing any or all of the example audience monitor sites 80 of FIG. 3 is shown in FIG. 5. For example, the example machine accessible instructions of FIG. 5 may be embodied in coded instructions stored on a tangible medium such as a flash memory, a read-only memory (ROM) and/or random-access memory (RAM) associated with a processor (e.g., the example processor 600 discussed below in connection with FIG. 6. Alternatively, some or all of the example machine accessible instructions of FIG. 5 may be implemented using any combination(s) of application specific integrated circuit(s) (ASIC(s)), programmable logic device(s) (PLD(s)), field programmable logic device(s) (FPLD(s)), discrete logic, hardware, software, and/or firmware. Also, some or all of the example machine accessible instructions of FIG. 5 may be implemented manually or as any combination of any of the foregoing techniques. For example, any or all of the metadata processor 132, the data logging device 134, the program identifier 136 and/or the people meter 137 may be implemented as any combination of firmware, software, discrete logic and/or hardware. Thus, for example, any of the example metadata processor 132, the example data logging device 134, the example program identifier 136 and/or the example people meter 137 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended claims are read to cover a purely software implementation, at least one of the example metadata processor 132, the example data logging device 134, the example program identifier 136 and/or the example people meter 137 recited in that claim are hereby expressly defined to include a tangible medium such as a memory, DVD, CD, etc. Further, although the example machine accessible instructions of FIG. 5 are described with reference to the flowcharts of FIG. 5, many other methods of implementing the machine accessible instructions of FIG. 5 may be employed. For example, the order of execution of the blocks may be changed, and/or one or more of the blocks described may be changed, eliminated, sub-divided, or combined. Additionally, any or all of the example machine accessible instructions of FIG. 5 may be carried out sequentially and/or carried out in parallel by, for example, separate processing threads, processors, devices, discrete logic, circuits, etc.

The program of FIG. 5 begins at block 200 where the metadata processor 132 attempts to detect intentionally placed products in the media content tuned by the audience. The process of attempting to detect intentionally placed products employed at block 200 of FIG. 5 may be substantially similar or identical to the process described above in connection with blocks 50, 52 and 54 of FIG. 4. Thus, for example, the metadata processor 132 may spawn a first thread to collect and store all metadata detected in the tuned media content and may spawn one or more instances of a second thread to process the metadata collected by the first thread.

Control remains at block 200 searching for an intentionally placed product until such a product is detected. Upon detection of an intentionally placed product (block 200), the metadata processor 132 creates an event record in the data logging device 134 for the detected product (block 202). In creating the record, the metadata processor 132 causes the program identifier 136 and/or the people meter 137 to write their current data (e.g., the program identification information and the audience composition information) in the event record of the data logging device 134.

The metadata processor 132 then waits a predetermined time to see whether an audience member selects the intentionally place product (e.g., via a point-and-click device) (block 204). If selection of the intentionally placed product does not occur within a given time of the detection of the product (block 204), the metadata processor 132 updates the event record to reflect that the intentionally placed product was not selected by the audience (block 206). Control then return to block 200.

If selection of the intentionally placed product does occur within the given time period commencing with the detection of the product (block 204), the metadata processor 132 starts a first timer to time the duration of the audience interaction with the sales information for the intentionally placed product (block 208). When the sales information is closed (block 210), the metadata processor 132 stops the first timer (block 212) and records the duration of the audience interaction with the sales information for the intentionally placed product in the corresponding event record (block 214). Control then return to block 200.

If the sales information has not yet been closed (block 210), the metadata processor 132 determines whether a URL associated with the sales information has been selected (block 216). If the URL has not been selected, control returns to block 210. Control continues to loop through blocks 210 and 216 until the product information window is closed (block 210) and/or the URL associated with the sales information is selected (block 216).

Assuming for purposes of discussion that the URL is selected (block 216), control advances to block 218. At block 218, the metadata processor 132 starts a second timer to time the duration of the audience interaction with the webpage retrieved via the URL (block 218). The metadata processor 132 then records the selection of the URL in the event record for the corresponding intentionally placed product (block 220).

When the webpage (or the window in which the webpage) is closed (block 222), the metadata processor 132 stops the second timer (block 224) and records the duration of the audience interaction with the webpage for the intentionally placed product in the corresponding event record (block 2226). Control then return to block 210. Control remains at blocks 222 until the webpage is closed (block 222). Closing of the webpage can be detected by, for example, monitoring operating system events (e.g., for an event requesting the invalidation of the window in which the webpage is displayed). Although not shown in FIG. 5, one or more additional timers can be initiated for each link followed from the webpage. In other words, if selecting the product placement leads the audience member to visit a series of web pages, the time spent on each such webpage and the URL associated with the same is logged.

Figure 6:
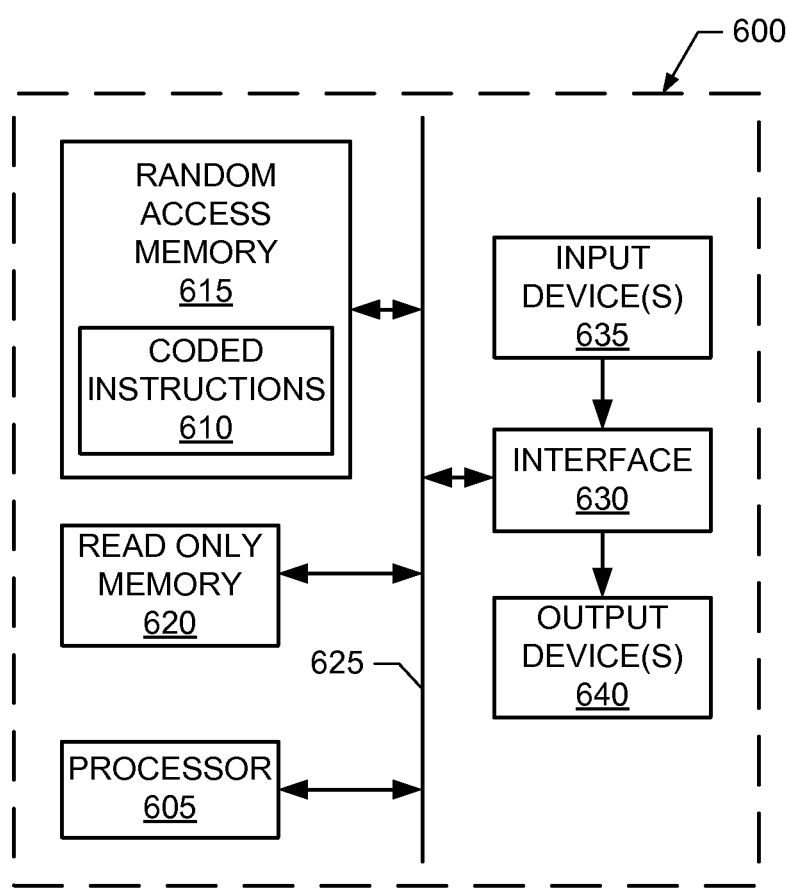
FIG. 6 is a schematic illustration of an example processor platform that may be used and/or programmed to execute any or all of the example machine accessible instructions of FIGS. 4 and/or 5 to implement any or all of the example placement monitor sites, the example audience monitor sites, and/or the example systems and/or methods described herein.

An example processor platform 600 that may execute any or all of the machine readable instructions of FIGS. 4 and/or 5 to implement any or all of the example placement monitor sites 22 and/or the example audience monitor sites 80 is shown in FIG. 6. The processor platform 600 of the example of FIG. 6 includes at least one general purpose programmable processor 605. The processor 605 executes coded instructions 610 present in main memory of the processor 605 (e.g., within a RAM 615 and/or a ROM 620). The processor 605 may be any type of processing unit, such as a processor core, a multi or single core processor and/or a microcontroller. The processor 605 may execute, among other things, the example machine accessible instructions of FIGS. 4 and/or 5 to implement any or all of the example metadata processors 32, 132, the example data logging devices 34, 134, and/or the example product identifiers 36, 136 described herein. The processor 605 is in communication with the main memory (including a ROM 620 and/or the RAM 615) via a bus 625. The RAM 615 may be implemented by DRAM, SDRAM, and/or any other type of RAM device, and ROM may be implemented by flash memory and/or any other desired type of memory device. Access to the memory 615 and 620 may be controlled by a memory controller (not shown). The RAM 615 may be used to store and/or implement, for example, any or all of the example data logging devices 34, 134 of FIG. 3.

The processor platform 600 also includes an interface circuit 630. The interface circuit 630 may be implemented by any type of interface standard, such as a USB interface, a Bluetooth interface, an external memory interface, serial port, general purpose input/output, etc. One or more input devices 635 and one or more output devices 640 are connected to the interface circuit 630. The example interface 630 may be used, for example, to export the placement monitoring information to the collection facility 24.

In many examples, the metadata processor(s) 32 of the placement monitor site(s) will have better access to the bit streams tuned by the corresponding STB than will the metadata processor(s) 132 at the audience monitor site(s) 80 because the equipment monitored at the audience monitor site 80 will not be owned by the measurement company and the measurement company will, thus, be able to take greater liberties with the equipment at the placement monitor site(s) 22. As a result, more detailed product placement information may be gathered at the placement monitor site(s) 22 then at the audience monitor site(s) 80. To overcome this issue, the collection facility 20 can correlate data collected at the placement monitor site(s) 22 with the data collected at the audience measurement site(s) 80 to create a more complete and robust picture of intentional product placements and audience response(s) thereto, The above described example methods and apparatus can be commercially exploited in many different ways. For example, the collected placement information may be compared to a database of contractual requirements to develop one or more saleable reports concerning compliance of the detected placement(s) with the underlying contract(s) driving the placement(s). Thus, for example, advertisers may pay the operator of the system 20 for a report(s) identifying whether the placement(s) they purchased occurred and if the characteristics of the placement(s) met the terms of the purchase agreement (e.g., the display size of the product was sufficiently large, the product was displayed sufficiently long, the product was displayed in at least an agreed number of occasions (e.g., scenes, programs, etc).

As another example, the data collected at the placement monitor site (e.g., placement identification information (e.g., product size, display duration, product type, product name, etc), program identification information, and timestamps) can be correlated with the audience measurement information (e.g., user interaction information, program identification information, timestamps and user demographics) collected at the audience monitor sites 80 to develop product placement exposure metrics. For example, with the data collected by the system 20, the collection facility can determine how many Caucasian households with an annual income between $40,000 and $60,000 interacted with the Imaginary Brand Sunglasses product placement 12 during the Monday Evening News on Channel X in Cincinnati. These metrics can be combined with audience measurement ratings for programs to provide a guide to the effectiveness of the product placement for a targeted audience either nationally or in particular geographic markets of interest. Additionally or alternatively, the product placements themselves can be afforded ratings and/or programs can be assigned "product placement ratings" based on their past effectiveness at reaching targeted audiences to enable advertisers and broadcasters to arrive at fair transaction process for placing intentionally placed products in advertisements.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A system to detect intentionally placed products in media content comprising:
   a placement monitor site including a logic circuit, the placement monitor site to record an occurrence of a first intentionally placed product within first broadcast media content in a product placement record;
   an audience measurement site to record an audience interaction with a second intentionally placed product in second broadcast media content in an event record, the audience interaction including a selection of the second intentionally placed product by an audience member; and
   a collection facility to store the product placement record and the event record.

2. The system of claim 1, wherein the collection facility correlates first data from the product placement record with second data from the event record to create a report.

3. The system of claim 2, wherein the report verifies that the first intentionally placed product appeared in the first broadcast media content.

4. The system of claim 1, wherein the first and second intentionally placed products are identical.

5. The system of claim 1, wherein the first and second intentionally placed products are different products.

6. The system of claim 2, wherein the report identifies user interaction with the second intentionally placed product.

7. The system of claim 1, wherein the collection facility compares at least one of data from the product placement record and data from the event record to a database of contractual requirements to develop a report concerning compliance with a contract to place the first intentionally placed product in the first media content.

8. The system of claim 7, wherein the report indicates whether a purchased product placement occurred.

9. The system of claim 7, wherein the report indicates whether a characteristic associated with display of the first intentionally placed product met a term of the contract.

10. The system of claim 9, wherein the characteristic includes at least one of a display size of the first intentionally placed product, a duration of display associated with the first intentionally placed product, a frequency of display of the first intentionally placed product.

11. The system of claim 10, wherein the frequency of display includes at least one of a number of scenes in which the first intentionally placed product is displayed and a number of programs in which the first intentionally placed product is displayed.

12. The system of claim 2, wherein the report identifies at least one of a display size, a display duration, a product name and a product type of the first intentionally placed product.

13. The system of claim 12, wherein the report identifies at least one of a program name, a broadcast source and a broadcast time of the first media content.

14. The system of claim 13, wherein the report identifies a product placement exposure metric including at least one of a user interaction with the first and/or second intentionally placed product, a characteristic of the user interaction with the first and/or second intentionally placed product, a time of occurrence of the user interaction with the first and/or second intentionally placed product, a duration of the user interaction with the first and/or second intentionally placed product, and a demographic characteristic of a user exposed to the first and/or second intentionally placed product.

15. The system of claim 1, wherein the collection facility combines a product placement exposure metric developed from at least one of the product placement record and the event record with an audience measurement rating for at least one of the first and second media content to measure effectiveness of placing the first and/or second intentionally product placement in the first and/or second media content for a targeted audience.

16. The system of claim 1, wherein the collection facility combines a product placement exposure metric developed from at least one of the product placement record and the event record with an audience measurement rating for at least one of the first and second media content to provide a product placement rating for at least one of the first intentionally placed product, the second intentionally placed product, a product type, the first media content and the second media content.

17. The system of claim 1, wherein the collection facility employs data from at least one of the product placement record and the event record to trigger a payment obligation by a commercial entity.

18. The system of claim 17, wherein the payment obligation is based on at least one of a pay-per-broadcast arrangement and a pay-per person view arrangement.

19. The system of claim 2, wherein the report provides a commercial entity with information about an advertisement strategy of a competitor.

* * * * *